Figure 1:
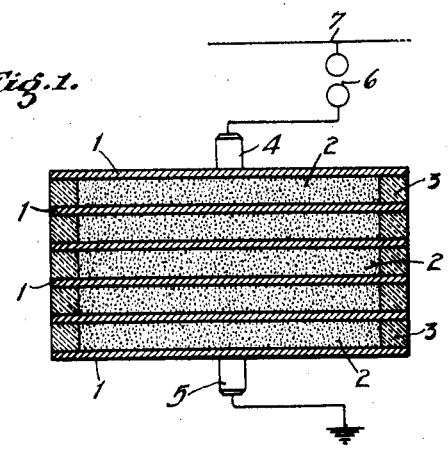
Figure 3:
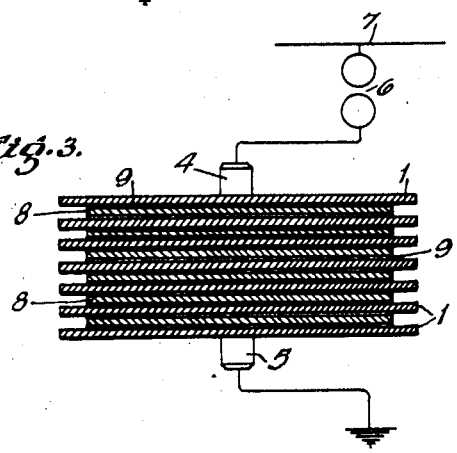
Figure 2:
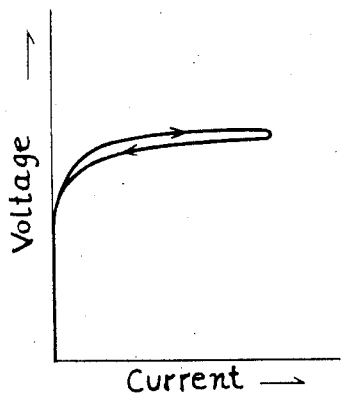

and passing an electric current through said elements to dry the adhesive material and applying pressure to said elements for securing said elements together and said elements to the support.

12. The method of enclosing a body with a facing, consisting in first enveloping a body with a metallic-like resistance material having a coating of volatile adhesive material having a high melting point, second enveloping the resistance material with a facing, then passing an electric current through the resistance material to heat the same to dry the adhesive material and then applying pressure to the facing to secure the resistance material to the body and the facing to the resistance material.

13. The method of securing a facing to a metal support consisting in arranging between the support and facing volatile adhesive material having a high melting point and passing an electric current through the metal support for heating the same to dry the adhesive material for securing the facing to the support.

14. The method of securing a metal facing to a support consisting in arranging a plurality of facing elements having a coating of volatile adhesive material on a support with their edges in contact with one another, and passing an electric current through said facing elements to dry and volatilize the volatile substances of the adhesive material to secure said elements together and to the support.

KENNETH E. CROOKS.
IRVIN F. DITTMAR.

Sept. 19, 1939.  S. FUJITAKA ET AL  2,173,625
LIGHTNING ARRESTER
Filed Sept. 16, 1935

S. Fujitaka
T. Takenouchi
INVENTORS

By Glascock Downing & Seebold
Attys.